United States Patent [19]

De Mets

[11] 3,942,927

[45] Mar. 9, 1976

[54] PRESSES FOR THE PRODUCTION OF BOARDS SUCH AS CHIPBOARD, FIBERBOARD AND THE LIKE

[75] Inventor: Albert De Mets, Kachtem, Izegem, Belgium

[73] Assignee: Bison-werke Bahre & Greten GmbH & Co. KG, Germany

[22] Filed: Apr. 24, 1973

[21] Appl. No.: 354,077

[30] Foreign Application Priority Data

Apr. 26, 1972 Germany .......... 2220553
Mar. 30, 1973 Germany .......... 2316068

[52] U.S. Cl. .......... 425/135; 425/366; 425/367; 425/406; 425/371; 100/154; 100/168

[51] Int. Cl.$^2$ .......... B29C 15/00

[58] Field of Search .......... 425/168, 371, 406, 367, 425/366, 135; 100/153, 154, 118, 168

[56] References Cited

UNITED STATES PATENTS

| | | | |
|---|---|---|---|
| 748,593 | 1/1904 | Eck | 100/168 X |
| 2,779,969 | 2/1957 | Bose | 425/371 |
| 2,909,804 | 10/1959 | Means | 425/371 X |
| 3,138,120 | 6/1964 | Balmer et al. | 425/371 |
| 3,561,359 | 2/1971 | Cohen | 100/168 |
| 3,584,570 | 6/1971 | Sass | 100/168 X |
| 3,736,089 | 5/1973 | Ross et al. | 425/371 X |
| 3,795,470 | 3/1974 | De Mets | 425/371 |

*Primary Examiner*—Robert L. Spicer, Jr.
*Attorney, Agent, or Firm*—Craig & Antonelli

[57] ABSTRACT

A continuously operating press for the production of panels, such as chipboards, fiberboards, and the like, and including two cooperating endless plate belts arranged so that the material forming the panels can be conveyed by and be compressed between the belts is also provided with drivable pressure rollers for driving the endless plate belts which are adapted to be moved to an oblique angle with respect to the path of travel of the belts. By moving the drive rollers to an oblique position, lateral displacement of the flexible endless belts surrounding the endless plate belts can be prevented.

24 Claims, 4 Drawing Figures

PRESSES FOR THE PRODUCTION OF BOARDS SUCH AS CHIPBOARD, FIBERBOARD AND THE LIKE

This invention concerns improvements in or relating to continuously operable presses for the production of boards such as chipboard, fibreboard and the like of the type comprising two superimposed endless conveyors comprising hingedly interconnected plates and arranged to rotate about horizontal and parallel shafts, the facing sides of which conveyors are movable in the same direction by drivable feed rollers, each endless plate conveyor being surrounded by a further endless conveyor belt or band. Continuously operating presses of this type are known both as preliminary presses and as final presses.

The lower endless conveyor belt or band of rubber, plastics or steel which surrounds the lower endless plate conveyor has in such continuously operable presses a much greater length than the corresponding upper endless conveyor belt or band because it serves as a support for the layer of material to be compressed which is scattered upon it. The greater the length of such a continuously operable press the more difficult it is to guide the endless plate conveyors which are moved by drivable feed rollers in their direction of movement so as to prevent them from being laterally deflected. Finally it should be noted that the length of the endless conveyor belts must also be relatively great because continuously operable final presses are to replace both known preliminary presses and also known finishing presses quite apart from the fact that when increasing the output of such final presses the effective length must be increased in order to bring about the same compression of the material to be compressed.

It is an object of the invention to ensure that during operation the endless plate conveyors are guided in such a way that lateral deflections are avoided, and the layer of material to be compressed and the finished board are moved along a straight path.

According to the invention I provide a continuously operable press for producing boards such as chipboard, fibreboard or the like of the type described including means serving to adjust at least at one end a plurality of superimposed pairs of feed rollers transversely of their axes in the horizontal plane.

Tests performed have shown that particularly effective adjusting means are slide members which are movable relative to one another, have inclined surfaces and which are adjustable substantially in the vertical direction. These adjusting means associated with the upper and lower feed rollers can be adjustable either jointly or independently of one another. The adjustment can be controlled by suitable sensing means such as feelers associated with the edges of the endless plate conveyors. So as to be able to perform the adjustment also during the operation of the press the bearings of the superimposed feed rollers may be supported by needle bearings or the like guided in guide rails.

Figure 1:
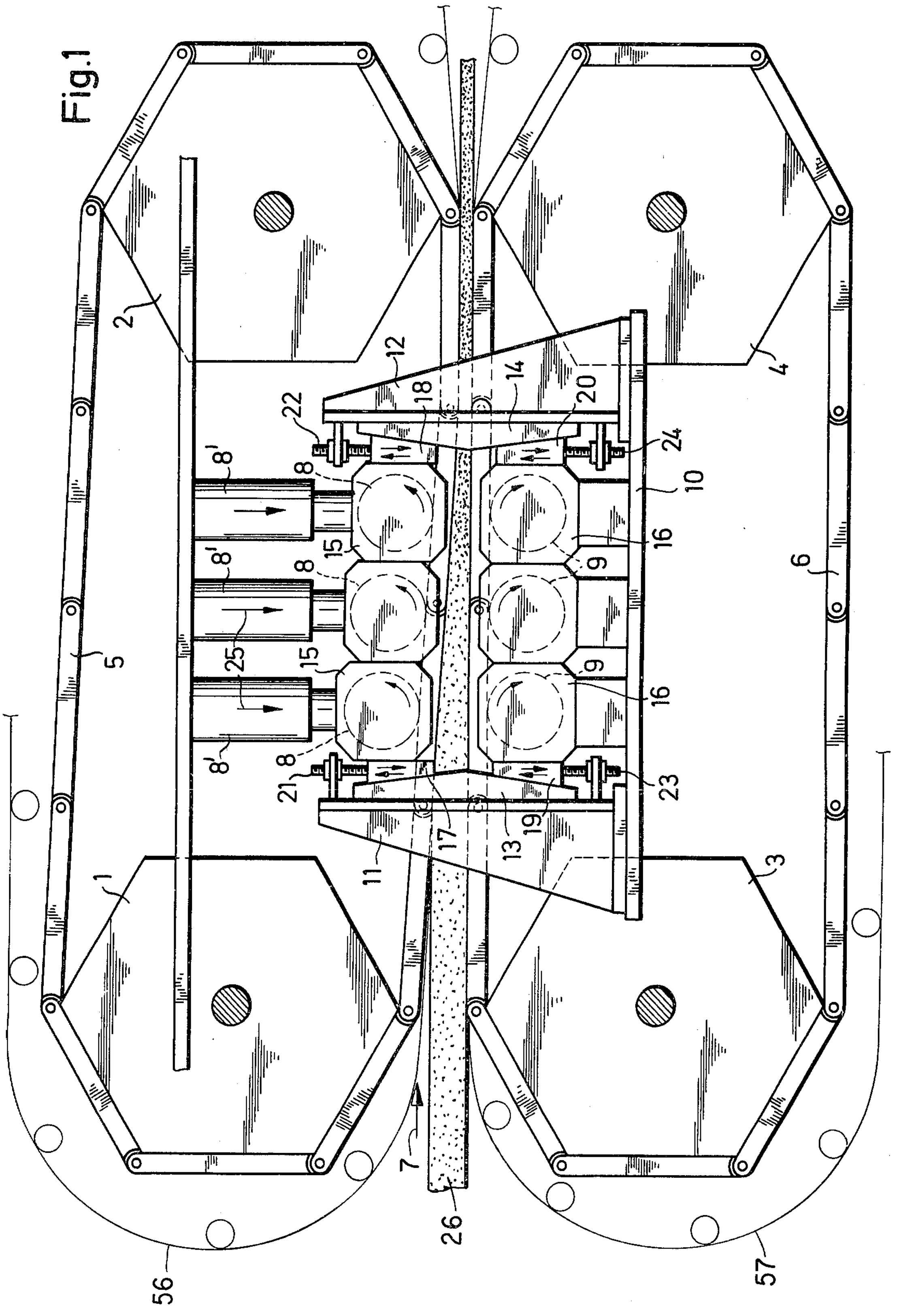
Figure 2:
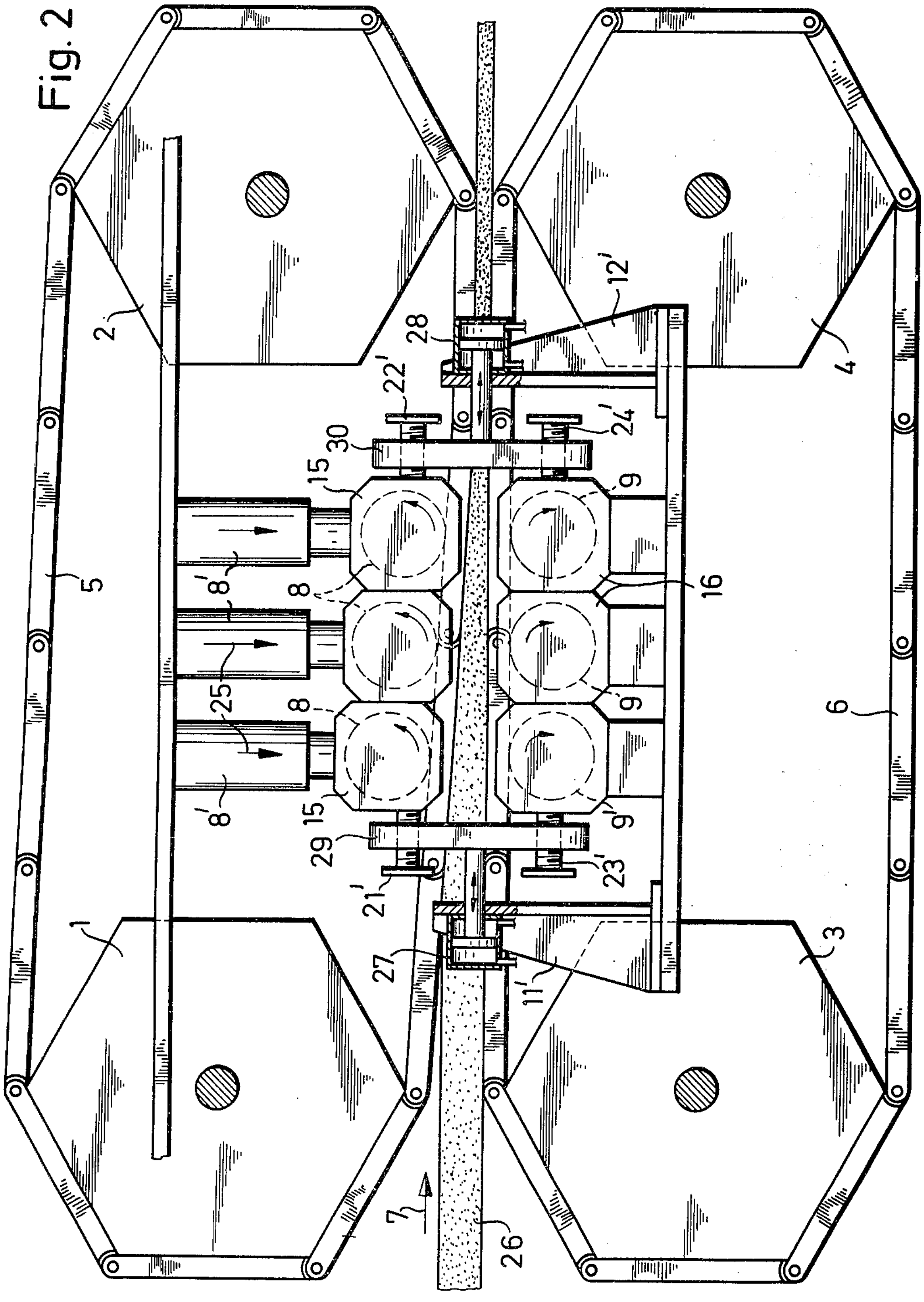
Figure 3:
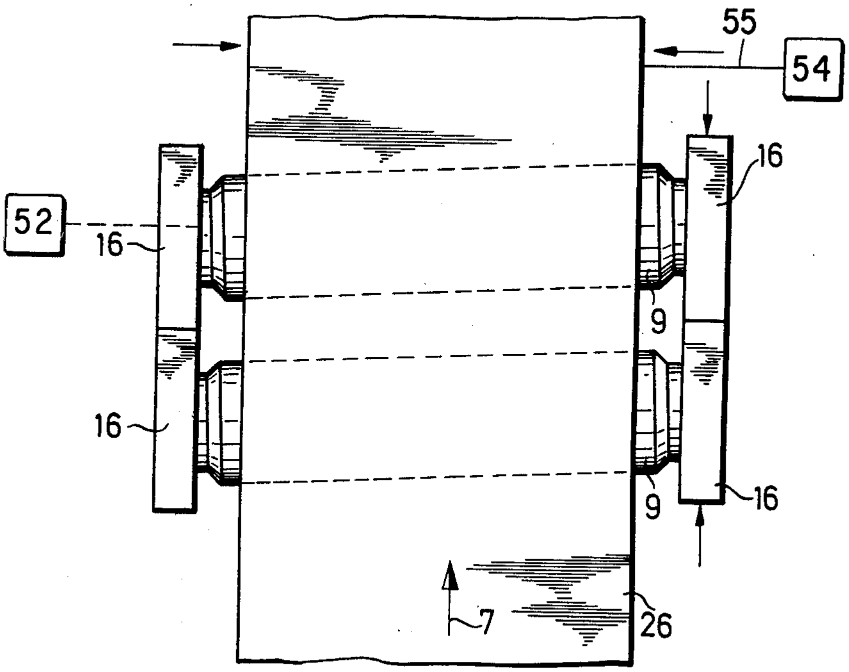
Figure 4:
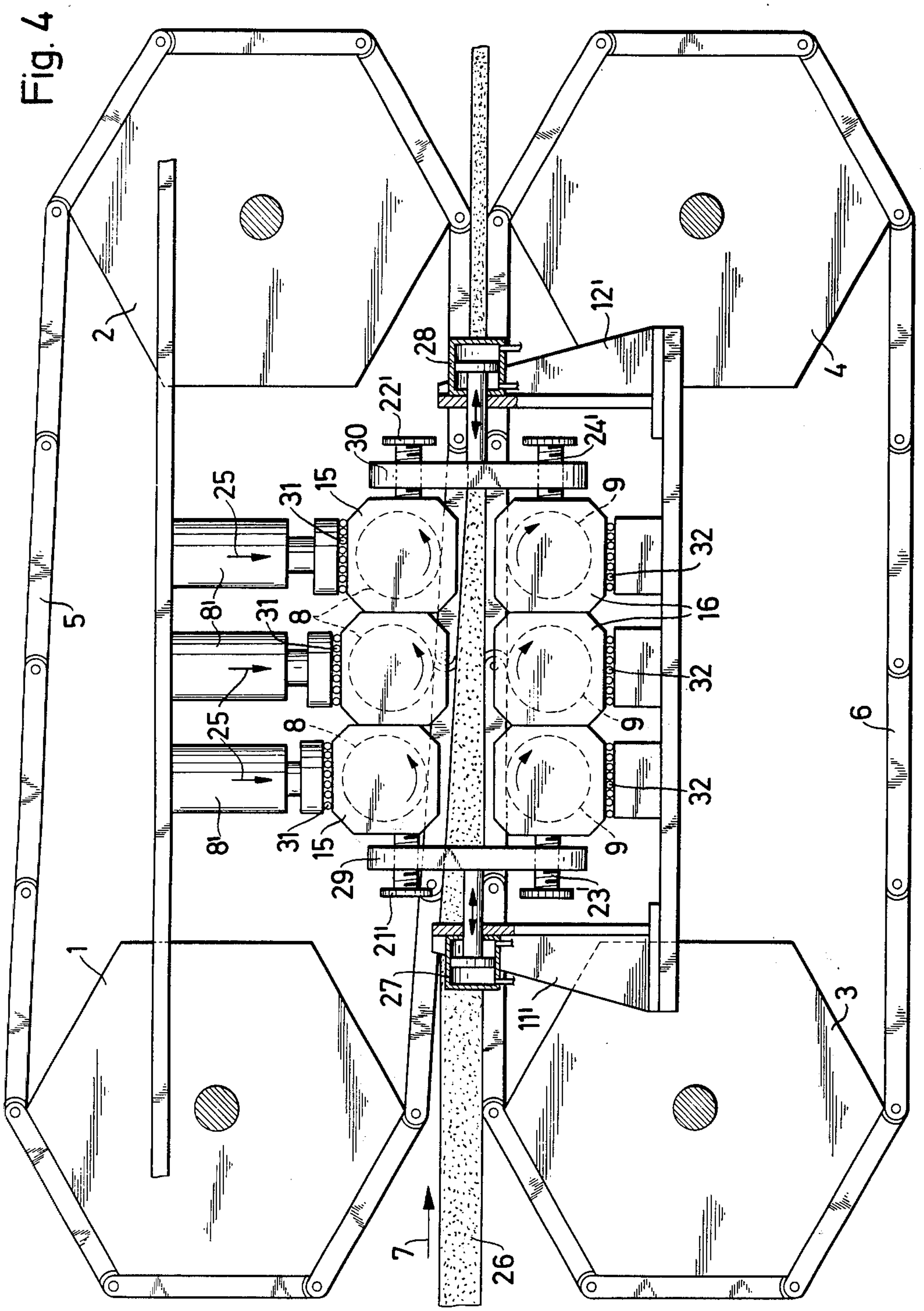

The invention will be further described with reference to two embodiments shown in the accompanying drawings in which:

FIG. 1 is a side view of a continuously operable press with drivable feed rollers and endless conveyor belts or bands shown in partial section surrounding the endless plate conveyors whereof the lower one serves to supply a layer of material to the press, FIG. 2 shows a side view corresponding to FIG. 1 of a second embodiment, FIG. 3 a partial plan view of the lower part of the press with only two inclined feed rollers, FIG. 4 shows a variant of the embodiment shown in FIG. 2.

In each frame (not shown) are mounted polygonal guide rollers 1 and 2 and 3 and 4 for an upper endless plate conveyor 5 or a lower endless plate conveyor 6 surrounded by endless belts or bands 56 and 57, respectively (FIG. 1). In each case one of the guide rollers is guided and prestressed in such a way that the corresponding endless plate conveyor is also under a slight pretension. A plurality of drivable upper feed rollers 8 and a plurality of lower feed rollers 9 driven by drive means 52 (FIG. 3) serve to start the two endless plate conveyors moving in the direction of arrow 7.

Additional feed rollers which are not drivable are not shown because they are not important to the scope of the invention. To one of the frames is fixed a support 10 which carries two spaced brackets 11 and 12 each of which is provided with two projections 13 and 14 respectively which have oppositely inclined sloping surfaces. With each bracket are associated at least two projections 13/14 which extend on the respective sides of the endless plate conveyors 5 and 6. Between the projections 13 or 14 and the upper bearings 15 and lower bearings 16 of feed rollers 8 and 9 closest thereto slide members 17, 18 or 19, 20 adjustable substantially in the vertical direction, having inclined surfaces, and movable relative to one another are provided as the adjusting means.

In the embodiment according to FIG. 1 it is assumed that these slide members are adjustable by hand i.e., on the slide members spindles 21, 22 or 23, 24 are provided which are adjustable in height and securable by means of nuts. The surfaces of the slide member 17 facing bearings 15 or 16 extend in horizontal planes in the same way as the adjoining sides of bearings 15 or 16 so that by moving the associated slide members in the same sense in the vertical direction a horizontal displacement of the feed rollers is possible. The upper rollers are downwardly movable in the direction of arrow 25 whereas the lower rollers are assumed to be not adjustable in height. Despite a slight pretensioning in the horizontal direction the upper feed rollers 8 can be vertically displaced in order to initiate the necessary compressive forces for compressing a material layer 26 and for driving the endless plate conveyors 5 and 6. The pressure means 8′ of the upper bearings 15 of drive rollers 8 and the bearing 16 of the lower drive rollers are horizontally displaceable.

The embodiment according to FIG. 2 differs from that according to FIG. 1 substantially only in that in place of the adjusting means 13, 17, 19 or 14, 18, 20 other means are provided. On each side of the endless plate conveyors 5 and 6 brackets 11′ and 12′ are provided to which are fixed hydraulic cylinders 27 and 28 which serve to move the slide members 29 and 30 to and fro. So that the upper feed rollers 8 can also be displaced relative to the lower feed rollers 9 manually or automatically controlled spindles 21′, 22′, 23′, 24′ are provided which serve to guide bearings 15 or 16 in an equivalent manner.

To illustrate the one sided horizontal displacement FIG. 3 shows that the lower feed rollers 9 are adjusted on one side in the direction of movement 7 of the material 26 (i.e., one axial end of each roller 9 pivots about the other end in a plance substantially parallel to the travel path of the material 26) which necessarily leads to a lateral displacement of the driven endless plate conveyors.

The embodiment of FIG. 4 differs from the embodiment of FIG. 2 only slightly but nevertheless significantly. Here, between the pressure means 8' and the bearings 15 of upper drive rollers 8, needle bearings 31 are guided in guide rails (not shown) and between the bearings 16 of the lower feed rollers 9 and their fixed seatings needle bearing 32 are mounted in guide rails (not shown). These serve to reduce friction to such an extend that adjustments can also take place when the press is operating.

Obviously other equivalently functioning adjusting means can be provided. The control of the adjusting means is accomplished by a control means 54 connected to sensing means or feelers 55 associated with the edges of the endless plate conveyors.

What I claim is:

1. A continuously operating press for the production of panels, such as chipboards, fiberboards, and the like, including cooperating endless plate belts comprising mutually linked-together plates, said cooperating endless plate belts rotating about axes arranged substantially horizontally and substantially in parallel with each other so that said endless plate belts are in facing relationship and movable in the same direction over a material pressing portion of the travel paths of said plate belts, drivable presure rollers for driving said endless plate belts, said drivable pressure rollers arranged in at least one superposed pair, endless bands surrounding and movable with each endless plate belt, and adjusting means for moving one axial end of each pressure roll of at least one superposed pair of pressure rollers in a substantially horizontal plane so that the projection of the axis of the pressure roller being moved on the material pressing portion of the path of travel of at least one of said belts defines an oblique angle with respect to said direction.

2. A press according to claim 1, wherein the adjusting means are slide members adjustable substantially in the vertical direction, having inclined surfaces, and movable relative to one another, and projections fixed to the press and having inclined surfaces which are associated with said slide members.

3. A press according to claim 1, wherein the adjusting means are slide members movable to and fro in a horizontal direction each having spindles some of which act on the bearings of the upper feed rollers and others of which act on the bearings of the lower feed rollers.

4. A press according to claim 3, wherein the slide members are controlled by hydraulic cylinders.

5. A press according to claim 1, wherein the adjusting means associated with the upper and lower feed rollers are jointly adjustable.

6. A press according to claim 1, wherein the adjusting means are adjustable by feelers arranged on the edges of the endless plate belts.

7. A press according to claim 1, wherein the bearings of the superposed pairs of feed rollers are supported by needle bearings guided in guide rails.

8. A press according to claim 1, wherein the adjusting means associated with the upper and lower feed rollers are independently adjustable.

9. A press for continuously producing boards, such as chipboards, fiberboards, and the like, said press comprising:

a first movable belt;

a second movable belt;

guiding and moving means for guiding and moving said first and second movable belts with respective outer surfaces of said belts in facing relationship and moving in the same direction over a material pressing portion of the respective travel paths of said belts such that material forming said boards can be conveyed by and compressed between said belts along said material pressing portion of said respective travel paths;

pressure applying and driving means for driving said movable belts and for pressing said belts toward one another along said material pressing portion of the respective travel paths of said belts such that material for forming said boards may be forcibly compressed between said belts, said pressure applying and driving means including at least one pair of pressure rollers, one pressure roller in each pair being arranged inside the travel path of said first movable belt and the other pressure roller in said pair being arranged inside the travel path of said second movable belt; and adjusting means for orienting at least one pressure roller such that the projection of the axis of the moved pressure roller on the material pressing portion of at least one of said travel paths defines an oblique angle with respect to said direction, whereby lateral displacement of said movable belts is controlled.

10. A press according to claim 9 further including driving means for rotating at least one of said pressure rollers for driving said movable belts.

11. A press according to claim 10 including a plurality of pressure rollers, said adjusting means being adapted to obliquely orient each of the pressure rollers rotated by said driving means.

12. A press according to claim 11 wherein said first movable belt and said second movable belt are composed of hingedly interconnected plates arranged to rotate about horizontal and parallel shafts.

13. A press according to claim 12 further comprising endless bands surrounding and movable with each movable belt.

14. A press according to claim 10 wherein said first movable belt and said second movable belt are composed of hingedly interconnected plates arranged to rotate about horizontal and parallel shafts.

15. A press according to claim 14 further comprising endless bands surrounding and movable with each movable belt.

16. A press according to claim 10 further comprising sensing means for sensing the lateral displacement of at least one of said movable belts and for controlling said adjusting means in response to said lateral displacement.

17. A press according to claim 10 wherein said adjusting means comprise slide members adjustable substantially in the vertical direction, said slide members having inclined surfaces and movable relative to one another, said adjusting means further comprising projections fixed to the press and having inclined surfaces associated with said slide members.

18. A press according to claim 10 wherein the adjusting means comprises horizontally movable slide members, said slide members including spindles which act on the respective bearings of the upper feed rollers and lower feed rollers.

19. A press according to claim 18 further including hydraulic means for controlling said slide members.

20. A press according to claim 10 wherein said pressure applying and driving means includes a plurality of pressure rollers inside each of said movable belts, said press further comprising forcing means for forcibly moving the pressure rollers inside of said first movable belt in a direction transverse to the direction of travel of said movable belts.

21. A press for continuously producing boards, such as chipboards, fiberboards, and the like, said press comprising:

a first endless plate belt formed of a plurality of hingedly interconnected plates;

a second endless plate belt formed of a plurality of hingedly interconnected plates;

guiding and moving means for guiding and moving said first and second plate belts with respective outer surfaces of said plate belts in facing relationship and moving in the same direction over a material pressing portion of the respective travel paths of said plate belts such that the material for forming said boards can be conveyed by and compressed between said plate belts along said material pressing portion of said respective travel paths;

pressure applying means for pressing said endless plate belts toward one another along said material pressing portion of the respective travel paths of said endless plate belts such that board material may be forcibly pressed between said endless belts, said pressure applying means including a plurality of pressure rollers arranged inside of the travel path of at least one of said plate belts and forcing means for forcing said pressure rollers against the plates of said at least one endless plate belt;

drive means for rotably driving at least one of said pressure rollers such that said at least one of said pressure rollers applies moving forces to said plates to move said at least one of said endless plate belts along its respective travel path; and adjusting means for moving one axial end of each pressure roller in the plane substantially parallel to the material pressing portion of at least one of said travel paths so that the pressure roller moved is oriented at an oblique angle with respect to said direction.

22. A press according to claim 21 wherein said pressure rollers are arranged in superposed pairs, one pressure roller in each pair arranged inside the travel path of said first endless plate belt and the other pressure roller in said pair being arranged inside the travel path of said second endless plate belt, each pair of pressure rollers cooperating to compress the board material between said first plate belt and said second plate belt.

23. A press according to claim 20 further including sensing means for sensing the lateral displacement of at least one of said plate belts and for controlling said adjusting means in response to the lateral displacement sensed by the sensing means.

24. A press for continuously producing boards, such as chipboards, fiberboards, and the like, said press comprising:

a first movable belt;

a second movable belt;

guiding and moving means for guiding and moving said first and second movable belts with respective outer surfaces of said belts in facing relationship and moving in the same direction over a material pressing portion of the respective travel paths of said belts such that material forming said boards can be conveyed by and compressed between said belts along said material pressing portion of said respective travel paths;

pressure applying and driving means for driving said movable belts and for pressing said belts toward one another along said material pressing portion of the respective travel paths of said belts such that material for forming said boards may be forcibly compressed between said belts, said pressure applying and driving means including at least one pair of pressure rollers, one pressure roller in each pair being arranged inside the travel path of said first movable belt and the other pressure roll in said pair being arranged inside the travel path of said second movable belt; and adjusting means for pivoting at least one pressure roller about one of its axial ends in a plane substantially parallel to the material pressing portion of at least one of said travel paths, whereby lateral displacement of said movable belts is controlled.

* * * * *